United States Patent
Saigo

(10) Patent No.: US 8,449,120 B2
(45) Date of Patent: May 28, 2013

(54) IMAGE PROCESSING DEVICE, IMAGE DISPLAY SYSTEM, AND IMAGE PROCESSING METHOD

(75) Inventor: Manabu Saigo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 336 days.

(21) Appl. No.: 13/023,853

(22) Filed: Feb. 9, 2011

(65) Prior Publication Data

US 2011/0193875 A1 Aug. 11, 2011

(30) Foreign Application Priority Data

Feb. 10, 2010 (JP) .................................. 2010-027323

(51) Int. Cl.
*G03B 21/14* (2006.01)
(52) U.S. Cl.
USPC ............................................ 353/69; 348/625
(58) Field of Classification Search
USPC ...... 353/30, 31, 69, 70, 71, 84, 122; 348/625, 348/745; 345/582, 597; 382/266–269
See application file for complete search history.

(56) References Cited

U.S. PATENT DOCUMENTS

| | | | |
|---|---|---|---|
| 6,384,859 B1* | 5/2002 | Matsumoto et al. ............. | 348/43 |
| 8,063,894 B2* | 11/2011 | Yamada ......................... | 345/204 |
| 2006/0066643 A1* | 3/2006 | Arai et al. ...................... | 345/690 |
| 2006/0092329 A1* | 5/2006 | Noji .............................. | 348/607 |
| 2009/0180689 A1* | 7/2009 | Komiya et al. ................ | 382/167 |
| 2009/0226052 A1* | 9/2009 | Fedele et al. ................... | 382/125 |
| 2009/0256854 A1* | 10/2009 | Mizukoshi et al. ........... | 345/589 |
| 2010/0123774 A1 | 5/2010 | Tomita | |

FOREIGN PATENT DOCUMENTS

| | | |
|---|---|---|
| CN | 101738732 A | 6/2010 |
| JP | A-2005-352171 | 12/2005 |

\* cited by examiner

*Primary Examiner* — Seung C Sohn
(74) *Attorney, Agent, or Firm* — Oliff & Berridge, PLC

(57) ABSTRACT

An image processing device that corrects unevenness of a display image that is generated by overlapping a plurality of images, includes: a correction table storing unit that stores a plurality of types of correction tables; and an unevenness correction processing unit that performs an unevenness correcting process of an input image signal corresponding to the plurality of images based on a correction table selected from the plurality of types of correction tables stored in the correction table storing unit that corresponds to a designated display mode.

9 Claims, 10 Drawing Sheets

IMAGE PROCESSING DEVICE, IMAGE DISPLAY SYSTEM, AND IMAGE PROCESSING METHOD

The entire disclosure of Japanese Patent Application No. 2010-027323, filed Feb. 10, 2010 is expressly incorporated by reference herein.

BACKGROUND

1. Technical Field

The present invention relates to an image processing device, an image display system, and an image processing method.

2. Related Art

Generally, projectors (image projecting apparatuses) as one type of an image display device have the advantages of a large screen, simple installation, and occupying a small area and are used for various purposes. As a technology for improving the resolution or the brightness of a projection image projected by the projectors, a stack display technology using a plurality of projectors is known. Various methods for enhancing the evenness are proposed for improving the display quality even when such a stack display is performed.

For example, in JP-A-2005-352171, a technology not for performing color unevenness correction for each projector but for calculating intensity profiles acquired by adding each light source color and performing color unevenness correction in order that there is uniformity in colors in the stacked state is disclosed. According to JP-A-2005-352171, the color unevenness does not need to be reduced for each projector, but the color unevenness of an image displayed in the stacked state is reduced regardless of non-uniformity in the colors of each projector.

According to the stack display technology, not only the resolution or the brightness is improved by overlapping a plurality of images, but also a three-dimensional (hereinafter, abbreviated as 3D) display can be achieved by displaying images having parallax from the projectors. Accordingly, by designating a display mode, a switching of a display between a 3D display and a stack display can be performed by the projectors alone.

However, according to JP-A-2005-352171, a parallax image projected by a single projector is observed in the case of the 3D display. Accordingly, there is a problem in that a state in which the color unevenness remains is observed.

SUMMARY

An advantage of some aspects of the invention is that it provides an image processing device, an image display system, an image processing method, and the like capable of displaying an image in which the unevenness is reduced even in the case of switching between display modes.

According to an aspect of the invention, there is provided an image processing device that corrects unevenness of a display image that is generated by overlapping a plurality of images. The image processing device includes: a correction table storing unit that stores a plurality of types of correction tables; and an unevenness correction processing unit that performs an unevenness correcting process of an input image signal corresponding to the plurality of images based on a correction table selected from the plurality of types of correction tables stored in the correction table storing unit that corresponds to a designated display mode.

According to the this aspect, the plurality of types of correction tables is stored, and the unevenness correcting process is performed for an input image signal while changing the correction table in accordance with a designated display mode. Therefore, an image processing device capable of displaying an image in which the unevenness is reduced even in a case where display is performed by switching between display modes can be provided.

According to another aspect of the invention, in the above-described image processing device, the correction table storing unit stores a first display mode correction table and a second display mode correction table, and the unevenness correction processing unit performs the unevenness correcting process of the input image signal based on the first display mode correction table if the designated display mode is a first display mode, and performs the unevenness correcting process of the input image signal based on the second display mode correction table if the designated display mode is a second display mode.

According to this aspect, a configuration in which the correction table is arranged for each display mode, and the unevenness correction processing unit reads out a correction table corresponding to the designated display mode is used. Therefore, in addition to the above-described advantages, the configuration of the correction table can be simplified.

According to still another aspect of the invention, in the above-described image processing device, the plurality of images includes a first image and a second image, the first display mode correction table is generated such that unevenness of the first image and unevenness of the second image are reduced, and colors of the first image and the second image corresponding to a given gray scale value are the same, and the second display mode correction table is generated such that the unevenness of the display images is reduced.

According to this aspect, in addition to the above-described advantages, in the first display mode, images are displayed such that the unevenness of each image is reduced, and the colors of given gray scale values of the first image and the second image are the same. On the other hand, in the second display mode, the unevenness of a display image acquired by overlapping the first image and the second image is reduced. Therefore, a contribution can be made to displaying of an image in which the unevenness is reduced in accordance with the display mode.

According to yet another aspect of the invention, in the above-described image processing device, the second display mode correction table is generated such that the unevenness of the first image is reduced by overlapping the first image and an image other than the first image.

According to this aspect, in the second display mode, the unevenness of the first image as a display image is reduced by overlapping the first image and an image other than the first image. Therefore, in a case where an image is displayed while switching between the display modes is performed, for example, the unevenness of a stack image can be reduced in the second display mode.

According to still yet another aspect of the invention, in the above-described image processing device, the first display mode is a three-dimensional display mode in which a parallax image is displayed by overlapping the first image and the second image, and the second display mode is a stack display mode in which a stack image is displayed by overlapping the first image and the second image.

According to this aspect, in addition to the above-described advantages, an image processing device capable of displaying an image in which the unevenness is reduced even in a case where switching between the three-dimensional display mode and the stack display mode is performed can be provided.

According to further another aspect of the invention, in the above-described image processing device, the first display mode correction table includes a first correction table and a second correction table, the second display mode correction table includes a third correction table and a fourth correction table, the unevenness correction processing unit includes: a first unevenness correction processing section that performs the unevenness correcting process of the input image signal based on the first correction table if the designated display mode is the first display mode and performs the unevenness correcting process of an input image based on the third correction table if the designated display mode is the second display mode; and a second unevenness correction processing section that performs the unevenness correcting process of the input image signal based on the second correction table if the designated display mode is the first display mode and performs the unevenness correcting process of the input image based on the fourth correction table if the designated display mode is the second display mode, the image signal after the unevenness correcting process performed by the first unevenness correction processing section is supplied to a first image display unit that generates the first image, and the image signal after the unevenness correcting process performed by the second unevenness correction processing section is supplied to a second image display unit that generates the second image.

According to this aspect, a configuration in which an unevenness correction table corresponding to the designated display mode is read out, and the unevenness correcting process is performed by an unevenness correction processing unit corresponding to the display mode is used. Therefore, in addition to the above-described advantages, the unevenness correcting process can be simplified.

According to still further another aspect of the invention, there is provided an image display system including: a first image display unit; a second image display unit; an operation unit that is used for designating a display mode; and any one of the above-described image processing device according that supplies an image signal after an unevenness correcting process to at least one of the first image display unit and the second image display unit.

According to this aspect, an image display system capable of displaying an image in which the unevenness is reduced even in a case where display is performed by switching between display modes can be provided.

According to yet further another aspect of the invention, there is provided an image display system including: a first image display unit; a second image display unit; a synthesis unit that composes image light corresponding to images generated by the first image display unit and the second image display unit; an operation unit that is used for designating a display mode; and any one of the above-described image processing devices that supplies an image signal after an unevenness correcting process to at least one of the first image display unit and the second image display unit. An image is displayed by using the image light synthesized by the synthesis unit.

According to this aspect, an image display system capable of displaying an image in which the unevenness is reduced even in a case where display is performed by switching between display modes can be provided.

According to still yet further another aspect of the invention, there is provided an image processing method for correcting unevenness of a display image that is generated by overlapping a plurality of images. The image processing method includes: performing an unevenness correcting process of an input image signal corresponding to the plurality of images based on a correction table selected from a plurality of types of correction tables that corresponds to a designated display mode; and supplying the image signal after the unevenness correcting process that is acquired in the performing of an unevenness correcting process to at least one image display unit.

According to this aspect, an image processing method capable of displaying an image in which the unevenness is reduced even in a case where display is performed by switching between display modes can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. The invention described in the claims should not be construed as being limited to the embodiments described below. In addition, all the configurations described below are not essential elements of the invention.

Hereinafter, an image projecting apparatus will be described as an example of an image display apparatus (an image display system in a broad sense) according to an embodiment of the invention. However, the invention is not limited thereto.

Embodiment 1

Figure 1:
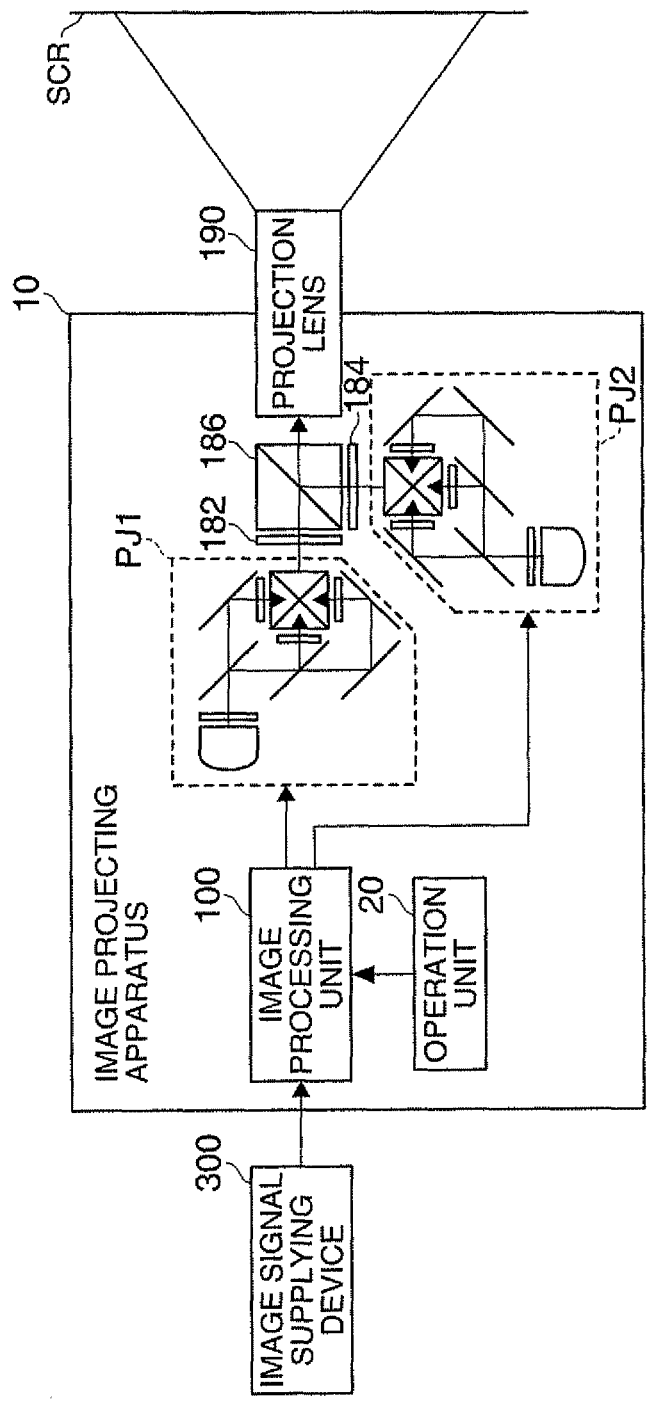
FIG. 1 is a block diagram showing an example of the configuration of an image projecting apparatus according to Embodiment 1 of the invention.

FIG. 1 is block diagram showing an example of the configuration of an image projecting apparatus according to Embodiment 1 of the invention. FIG. 1 shows an example of the image projecting apparatus that displays two images by overlapping the images. The configuration of a first image display unit PJ1 and a second image display unit PJ2 viewed from the top side is schematically shown.

An input image signal is supplied to the image projecting apparatus 10, from an image signal supplying device 300 that is configured by a DVD (Digital Versatile Disc) device, a Personal Computer (PC), or the like. The image projecting apparatus 10 includes: an operation unit 20; an image processing unit 100 (image processing device); the first image display unit PJ1; the second image display unit PJ2; polarization rotating elements 182 and 184; a Polarization Beam Splitter (PBS) 186; and a projection lens 190. This image projecting apparatus 10 can display a 3D display or a stack display on a polarization conservation screen SCR in a switching manner by projecting two images, which are displayed by the first image display unit PJ1 and the second image display unit PJ2, in an overlapping manner.

The operation unit 20 includes a user interface for selecting display modes including at least a 3D display mode (a first display mode) in which a 3D display for displaying a parallax image by overlapping a plurality of images is performed and a stack display mode (a second display mode) in which a stack display for displaying a stacked image by overlapping a plurality of images is performed. The operation unit 20 outputs operation information according to a display mode designated by an operator to the image processing unit 100. The image processing unit 100 performs an unevenness correcting process for the input image signal transmitted from the image signal supplying device 300 in accordance with the display mode specified by the operation information output from the operation unit 20 and supplies an image signal after the unevenness correcting process to the first image display unit PJ1 and the second image display unit PJ2. Accordingly, even when the image projecting apparatus 10 displays a 3D display and a stack display in a switching manner, an image in which unevenness (color unevenness and luminance unevenness) is decreased can be displayed.

The image processing unit 100 includes a CPU and a memory that are not shown in the figure. The CPU that reads in a program stored in the memory performs a process corresponding to the program, whereby the unevenness correcting process is realized. Alternatively, the function of the image processing unit 100 may be realized by a logic circuit such as an ASIC (Application Specific Integrated Circuit).

As shown in FIG. 1, the image signal after a correction process, which is performed by the image processing unit 100, is supplied to the first image display unit PJ1 and the second image display unit PJ2. However, the image signal may be supplied to at least one of the first image display unit PJ1 and the second image display unit PJ2.

Figure 2:
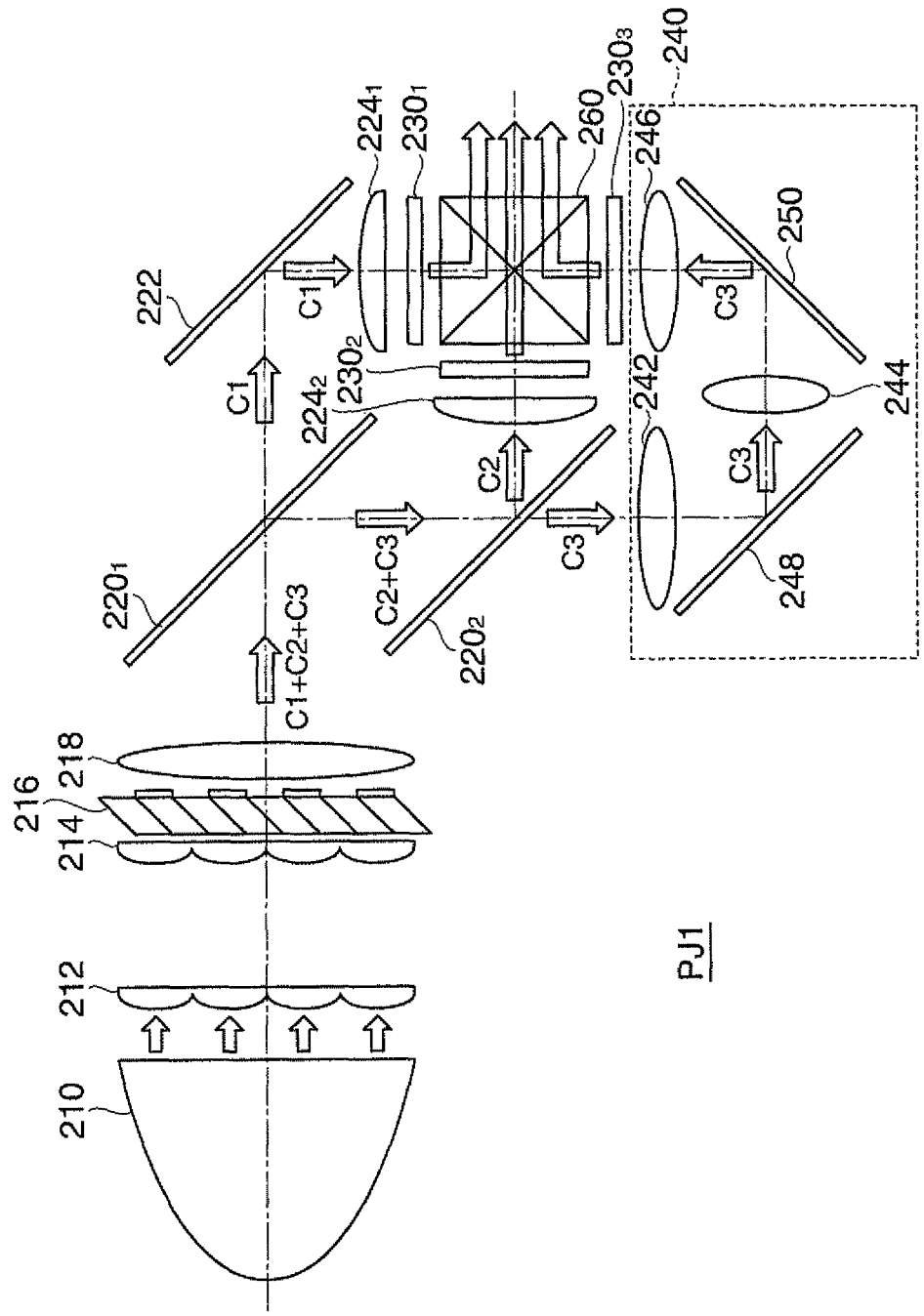
FIG. 2 is a diagram showing an example of the configuration of a first image display unit shown in FIG. 1.

FIG. 2 shows an example of the configuration of the first image display unit PJ1 shown in FIG. 1. FIG. 2 schematically shows the configuration of the first image display unit PJ1 viewed from the top side.

The first image display unit PJ1 according to Embodiment 1 includes: a light source section 210; integrator lenses 212 and 214; a polarization converting element 216; a compound lens 218; a first color light dichroic mirror $220_1$; a second color light dichroic mirror $220_2$; a reflection mirror 222; a first color light field lens $224_1$; a second color light field lens $224_2$; a first color light liquid crystal panel $230_1$; a second color light liquid crystal panel $230_2$; a third color light liquid crystal panel $230_3$; a relay optical system 240; and a cross dichroic prism 260 (color composition prism). Here, liquid crystal panels that are used as the first color light liquid crystal panel $230_1$, the second color light liquid crystal panel $230_2$, and the third color light liquid crystal panel $230_3$ are transmission-type liquid crystal display devices. The relay optical system 240 includes relay lenses 242, 244, and 246 and reflection mirrors 248 and 250.

The light source section 210, for example, is configured by an ultra-high pressure mercury lamp and emits light that includes at least first color light (C1), second color light (C2), and third color light (C3). The integrator lens 212 has a plurality of small lenses that is used for dividing the light emitted from the light source section 210 into a plurality of partial lights. In addition, the integrator lens 214 includes a plurality of small lenses corresponding to the plurality of small lenses of the integrator lens 212. The compound lens 218 overlaps the partial lights emitted from the plurality of small lenses of the integrator lens 212 on the liquid crystal panel. The polarization converting element 216 includes a polarization beam splitter array and a $\lambda/2$ plate. The polarization converting element 216 converts the light emitted from the light source section 210 into substantially one type of polarized light. The polarization beam splitter array has a structure in which a polarization separation film separating the partial lights divided by the integrator lens 212 into p-polarized light and s-polarized light and a reflection film changing the direction of light transmitted from the polarization separation film are alternately arranged. Two types of polarized light separated by the polarization separation film can have a uniform polarization direction by using the $\lambda/2$ plate. The compound lens 218 is irradiated with the light converted into the polarized light of substantially one type by the polarization converting element 216.

The light transmitted from the compound lens 218 is incident to the first color light dichroic mirror $220_1$. The first color light dichroic mirror $220_1$ has a function of reflecting the first color light and transmitting the second color light and the third color light. The second color light dichroic mirror $220_2$ is irradiated with the light transmitted through the first color light dichroic mirror $220_1$, and the light reflected by the first color light dichroic mirror $220_1$ is reflected by the reflection mirror 222 and is guided to the first color light field lens $224_1$.

The second color light dichroic mirror $220_2$ has a function of reflecting the second color light and transmitting the third color light. The light transmitted through the second color light dichroic mirror $220_2$ is incident to the relay optical system 240, and the light reflected by the second color light dichroic mirror $220_2$ is guided to the second color light field lens $224_2$.

The relay optical system 240 corrects the difference between the optical path lengths by using the relay lenses 242, 244, and 246, in order to minimize a difference between the optical path length of the third color light transmitted through the second color light dichroic mirror $220_2$ and the optical path lengths of the first color light and the second color light. The light transmitted through the relay lens 242 is guided to the relay lens 244 by the reflection mirror 248. The light transmitted through the relay lens 244 is guided to the relay lens 246 by the reflection mirror 250. The third color light liquid crystal panel $230_3$ is irradiated with the light transmitted through the relay lens 246.

The light with which the first color light field lens $224_1$ is irradiated is converted into parallel light and is incident to the first color light liquid crystal panel $230_1$. The first color light liquid crystal panel $230_1$ serves as an optical modulation unit (optical modulation element), and the transmittance (the passage rate or the modulation factor) thereof changes based on the first color light image signal configuring an image signal transmitted from the image processing unit 100. Accordingly, the light incident to the first color light liquid crystal panel 230$_1$ is modulated based on the first color light image signal, and the light after modulation is incident to the cross dichroic prism 260. The light with which the second color light field lens 224$_2$ is irradiated is converted into parallel light and is incident to the second color light liquid crystal panel 230$_2$. The second color light liquid crystal panel 230$_2$ serves as an optical modulation unit, and the transmittance thereof changes based on the second color light image signal configuring the image signal transmitted from the image processing unit 100. Accordingly, the light incident to the second color light liquid crystal panel 230$_2$ is modulated based on the second color light image signal, and the light after modulation is incident to the cross dichroic prism 260. The third color light liquid crystal panel 230$_3$ that is irradiated with the light converted into parallel light by the relay lenses 242, 244, and 246 serves as an optical modulation unit, and the transmittance thereof changes based on the third color light image signal configuring the image signal transmitted from the image processing unit 100. Accordingly, the light incident to the third color light liquid crystal panel 230$_3$ is modulated based on the third color light image signal, and the light after modulation is incident to the cross dichroic prism 260.

The first color light liquid crystal panel 230$_1$, the second color light liquid crystal panel 230$_2$, and the third color light liquid crystal panel 230$_3$ have the same configuration. Each liquid crystal panel is acquired by enclosing a liquid crystal as an electro-optical material between one pair of transparent glass substrates. Each liquid crystal panel modulates the passage rate of each color light in correspondence with an image signal of each sub pixel, for example, by using a polysilicon thin film transistor as a switching element.

The cross dichroic prism 260 has a function of outputting synthesized light that is acquired by synthesizing incident light from the first color light liquid crystal panel 230$_1$, the second color light liquid crystal panel 230$_2$, and the third color light liquid crystal panel 230$_3$ as outgoing light.

As above, each color light after modulation is synthesized by the cross dichroic prism 260 of the first image display unit PJ1, and thereby image light is generated. A polarization rotating element 182 is irradiated with the image light, and color light of each color component is formed to be uniform, for example, as s-polarization light by the polarization rotating element 182.

The second image display unit PJ2 has the same configuration as that of the first image display unit PJ1 shown in FIG. 2, and a polarization rotating element 184 is irradiated with image light that is acquired by synthesizing each color light after modulation using a cross dichroic prism of the second image display unit PJ2. The polarization rotating element 184 forms the color light of each color component to be uniform, for example, as p-polarization light.

In such a configuration, the optical system of the first image display unit PJ1 and the optical system of the second image display unit PJ2 are inverted. Accordingly, by supplying image signals of an arrangement of pixels of an image represented by the image signal supplied to the first image display unit PJ1 and an arrangement of pixels in a horizontally opposite direction to the second image display unit PJ2, the direction of an image displayed by the first image display unit PJ1 and the direction of an image displayed by the second image display unit PJ2 can be displayed to be uniform. Thus, the image processing unit 100 is configured to be able to output image signals in which pixels are arranged in opposite directions with respect to the horizontal direction of the image to the first image display unit PJ1 and the second image display unit PJ2.

The polarization beam splitter (synthesis unit) 186 composes image light from the polarization rotating element 182 and image light from the polarization rotating element 184 and irradiates the projection lens 190 with the synthesized light. The projection lens 190 projects the synthesized light from the polarization beam splitter 186 with an enlarged scale, thereby displaying an image on the polarization conservation screen SCR.

Accordingly, when designating the 3D display mode by operating the operation unit 20, an operator can observe a parallax image by seeing an image displayed on the polarization conservation screen SCR with polarization glasses on. On the other hand, when designating the stack display mode by operating the operation unit 20, the operator can observe a bright stack image with high resolution by seeing an image displayed on the polarization conservation screen SCR with the polarization glasses off.

Hereinafter, an image processing device that can display an image in which unevenness is reduced even in a case where the image is displayed by switching between the 3D display mode and the stack display mode will be described.

Figure 3:
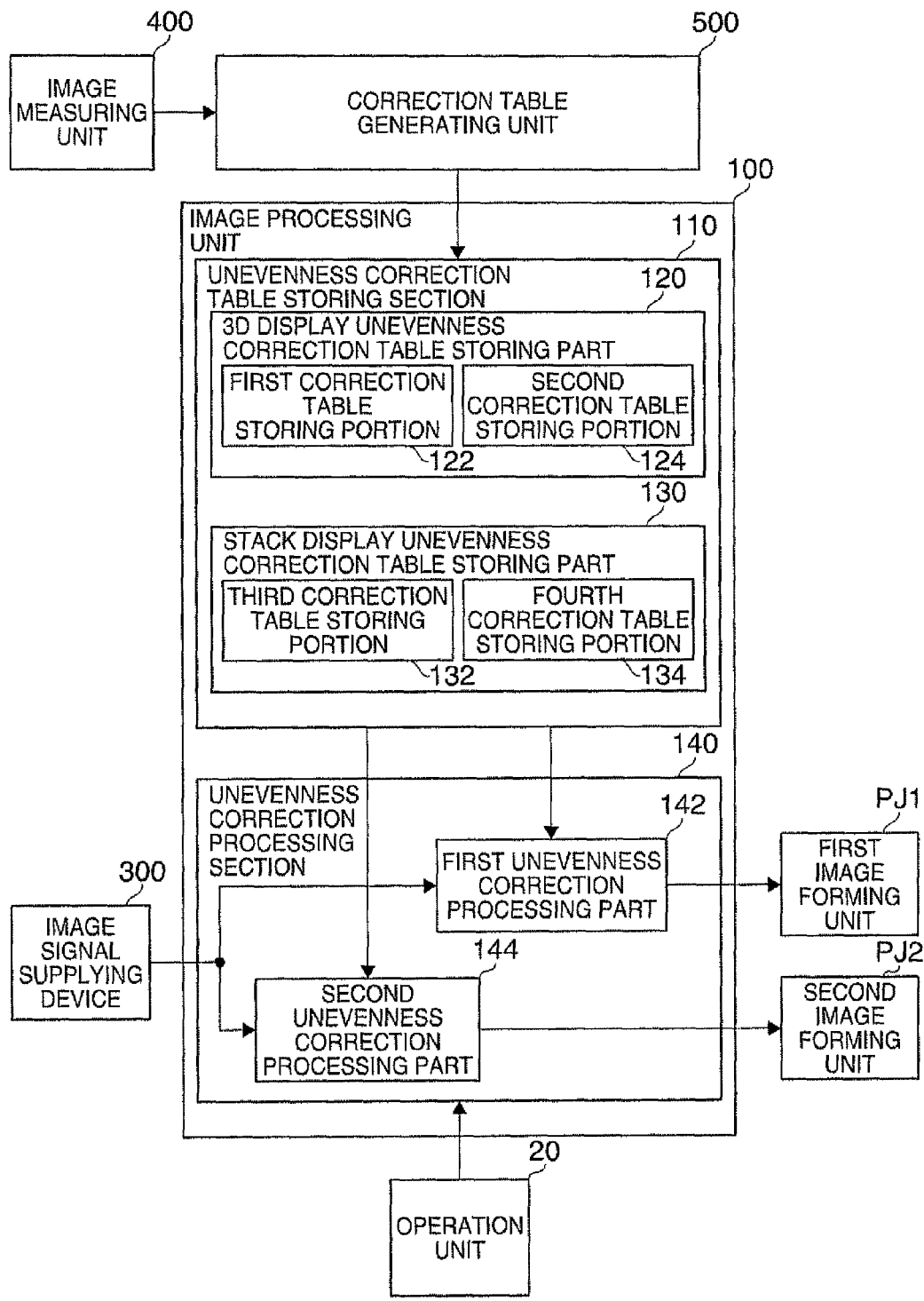
FIG. 3 is a block diagram showing an example of the configuration of an image processing unit shown in FIG. 1.

FIG. 3 shows a block diagram of an example of the configuration of the image processing unit 100 shown in FIG. 1. FIG. 3 additionally shows an image measuring unit and a correction table generating unit that are not shown in FIG. 1. In FIG. 3, the same reference numeral is assigned to the same portion as in FIG. 1, and the description thereof is appropriately omitted.

Figure 4:
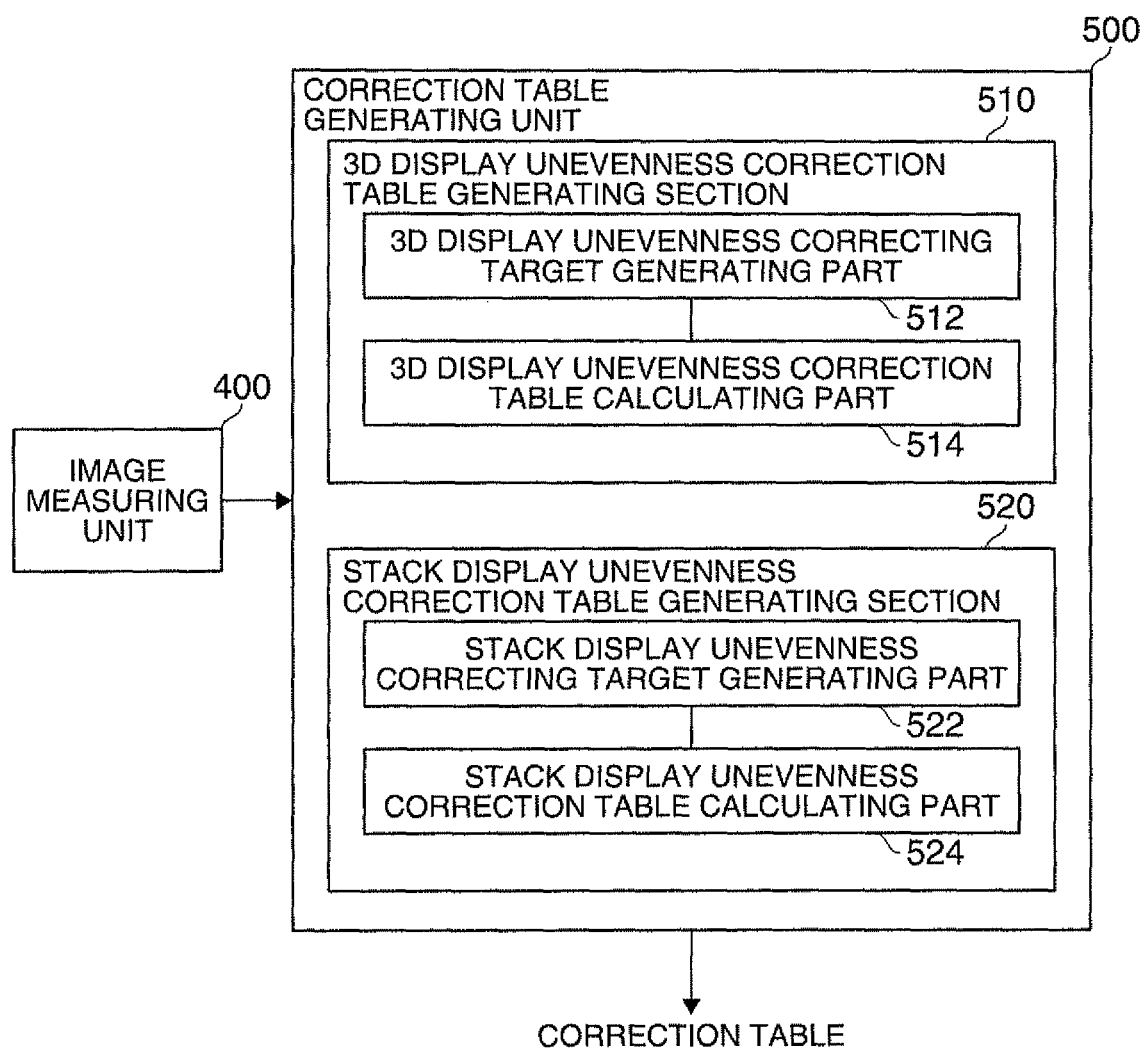
FIG. 4 is a block diagram showing an example of the configuration of a correction table generating section shown in FIG. 3.

FIG. 4 shows a block diagram of an example of the configuration of the correction table generating unit shown in FIG. 3. In FIG. 4, the same reference numeral is assigned to the same portion as in FIG. 3, and the description thereof is appropriately omitted.

The image processing unit 100 includes an unevenness correction table storing section (correction table storing unit) 110 and an unevenness correction processing section 140. The unevenness correction table storing section 110 stores a plurality of types of unevenness correction tables provided for each display mode. The unevenness correction table storing section 110 includes a 3D display unevenness correction table storing part (first display mode correction table storing unit) 120 and a stack display unevenness correction table storing part (second display mode correction, table storing unit) 130.

Assuming that the first color light is color light of an R component of RGB, the second color light is color light of a G component, and the third color light is color light of a B component, the unevenness correction table, for example, prepares correction data corresponding to the correction amount ($\Delta WRij$, $\Delta WGij$, $\Delta WBij$) of gray scale values Wij (Rij=Gij=Bij) at a pixel position (i,j) within an image for each pixel position and for each gray scale value. In such a case, pixel values (Rij', Gij', Bij') of an image signal after correction made by the unevenness correction processing section 140 for the pixel values (Rij, Gij, Bij) at the pixel position (i,j) of an input image signal is as follows.

$$Rij'=Rij+\Delta WRij$$

$$Gij'=Gij+\Delta WGij$$

$$Bij'=Bij+\Delta WBij \quad (1)$$

When the display mode designated by the operator through the operation unit 20 is the 3D display mode, the unevenness correction processing section 140 performs an unevenness correcting process of an input image signal based on a correction table that is stored in the 3D display unevenness correction table storing part 120. In addition, when the display mode designated by the operator through the operation unit 20 is the stack display mode, the unevenness correction processing section 140 performs an unevenness correcting process of an input image signal based on a correction table that is stored in the stack display unevenness correction table storing part 130. In other words, the unevenness correction processing section 140 performs an unevenness correcting process of an input image signal based on a correction table selected from the plurality of types of correction tables stored in the unevenness correction table storing section 110 that corresponds to a designated display mode.

Here, the 3D display unevenness correction table storing part 120 stores a correction table that is generated such that unevenness of images displayed by image display units configuring the first image display unit PJ1 and the second image display unit PJ2 is reduced and the colors of given gray scale values of both images displayed by the first image display unit PJ1 and the second image display unit PJ2 are the same. On the other hand, the stack display unevenness correction table storing part 130 stores a correction table that is generated such that unevenness of a stack image generated by overlapping two images displayed by the first image display unit PJ1 and the second image display unit PJ2 is reduced. In other words, the stack display unevenness correction table storing part 130 is a correction table that is generated so as to reduce the unevenness of an image by overlapping the image with another image.

The 3D display unevenness correction table storing part 120 includes a first correction table storing portion 122 that stores a first correction table arranged in correspondence with the first image display unit P31 and a second correction table storing portion 124 that stores a second correction table arranged in correspondence with the second image display unit PJ2. In addition, the stack display unevenness correction table storing part 130 includes a third correction table storing portion 132 that stores a third correction table arranged in correspondence with the first image display unit PJ1 and a fourth correction table storing portion 134 that stores a fourth correction table arranged in correspondence with the second image display unit PJ2.

The unevenness correction processing section 140 includes a first unevenness correction processing part 142 that is arranged in correspondence with the first image display unit PJ1 and a second unevenness correction processing part 144 that is arranged in correspondence with the second image display unit PJ2. When the display mode designated through the operation unit 20 is the 3D display mode, the first unevenness correction processing part 142 performs an unevenness correcting process of an input image based on the first correction table. On the other hand, when the display mode designated through the operation unit 20 is the stack display mode, the first unevenness correction processing part 142 performs an unevenness correcting process of an input image based on the third correction table. In addition, when the display mode designated through the operation unit 20 is the 3D display mode, the second unevenness correction processing part 144 performs an unevenness correcting process of an input image signal based on the second correction table. In addition, when the display mode designated through the operation unit 20 is the stack display mode, the second unevenness correction processing part 144 performs an unevenness correcting process of an input image based on the fourth correction table.

The image signal after the unevenness correcting process performed by the first unevenness correction processing part 142 is supplied to the first image display unit PJ1. On the other hand, the image signal after the unevenness correcting process performed by the second unevenness correction processing part 144 is supplied to the second image display unit PJ2 by inverting the arrangement of the pixels in the horizontal direction as described above.

The correction tables stored in the unevenness correction table storing section 110 are generated by the correction table generating unit 500 based on the result of measurement of an image that is performed by the image measuring unit 400. The correction table generating unit 500 includes a 3D display unevenness correction table generating section 510 and a stack display unevenness correction table generating section 520. The 3D display unevenness correction table generating section 510 includes a 3D display unevenness correcting target generating part 512 and a 3D display unevenness correction table calculating part 514. The 3D display unevenness correction table calculating part 514 calculates a 3D display unevenness correction table to be stored in the 3D display unevenness correction table storing part 120 for each image display unit with a 3D display unevenness correcting target generated by the 3D display unevenness correcting target generating part 512 used as a reference. The stack display unevenness correction table generating section 520 includes a stack display unevenness correcting target generating part 522 and a stack display unevenness correction table calculating part 524. The stack display unevenness correction table calculating part 524 calculates a stack display unevenness correction table to be stored in the stack display unevenness correction table storing part 130 for each image display unit with a stack display unevenness correcting target generated by the stack display unevenness correcting target generating part 522 used as a reference.

The correction table that is generated by the correction table generating unit 500 is stored in the image processing unit 100. It is preferable that this correction table generating unit 500, as described below, generates a correction target for each display mode and generates a correction table with the correction target used as a reference.

3D Display Unevenness Correcting Target Generating Part

The 3D display unevenness correcting target generating part 512 generates a 3D display unevenness correcting target by using the result of measurement of a projection image projected on the polarization conservation screen SCR that is performed by the image measuring unit 400.

Figure 5A:
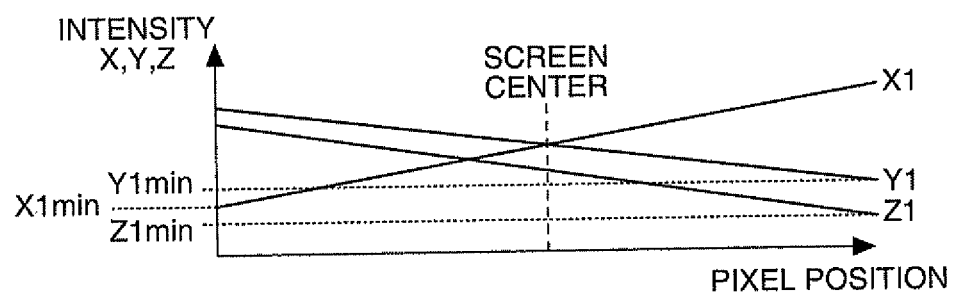
FIGS. 5A and 5B are diagrams showing examples of the result of measurement of a projection image, which is acquired by projecting images displayed by each image display unit shown in FIG. 1, that is performed by an image measuring unit.
Figure 5B:
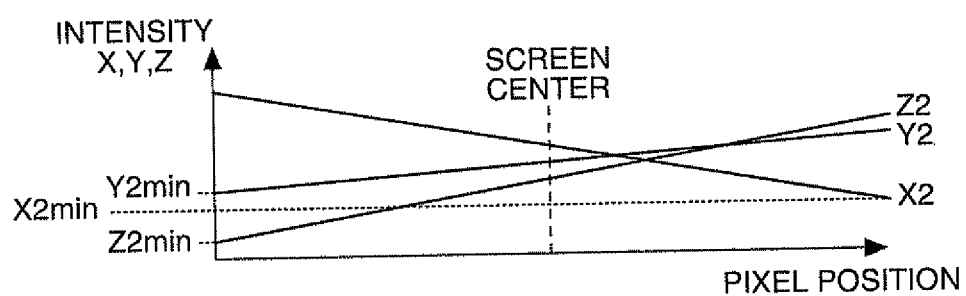

FIGS. 5A and 5B show examples of the result of measurement of a projection image, which is acquired by projecting images displayed by each image display unit shown in FIG. 1, that is performed by the image measuring unit 400. FIG. 5A shows an example of the result of measurement of a projection image having a given gray scale value that is performed by the first image display unit PJ1. FIG. 5B shows an example of the result of measurement of a projection image having a given gray scale value that is performed by the second image display unit PJ2. In FIGS. 5A and 5B, for simplification of the description, the vertical axis represents a stimulus value as the intensity, and the horizontal axis represents the measurement result at each pixel position in the horizontal direction of the projection image.

Figure 6:
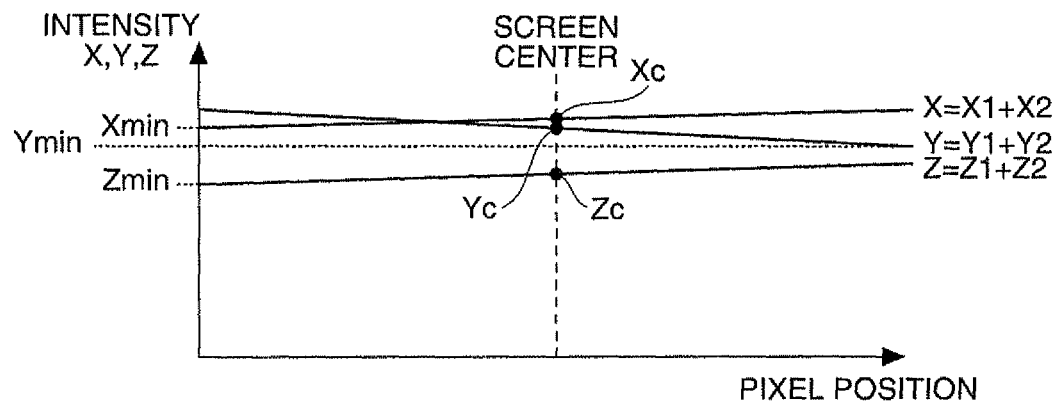
FIG. 6 is a diagram showing an example of the result of measurement of a stack image that is performed by the image measuring unit.

FIG. 6 shows an example of the result of measurement of a stack image, which is projected with two images displayed by the image display units overlapping each other, that is performed by the image measuring unit 400. FIG. 6 shows the measurement result of a projection image of an image, which has a given gray scale value, displayed by each image display unit.

In FIG. 6, similarly to FIGS. 5A and 5B, the vertical axis represents a stimulus value as the intensity, and the horizontal axis represents the measurement result at each pixel position in the horizontal direction of the projection image.

Figure 7:
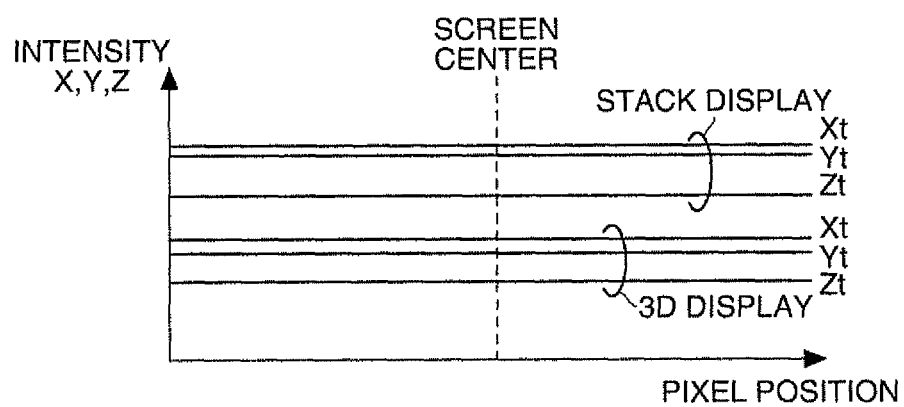
FIG. 7 is a diagram showing an example of a 3D display unevenness correcting target.

FIG. 7 shows an example of the 3D display unevenness correcting target. In FIG. 7, in addition to the 3D display unevenness correcting target, a stack display unevenness correcting target is shown. In FIG. 7, similarly to FIGS. 5A and 53, the vertical axis represents a stimulus value as the intensity, and the horizontal axis represents stimulus values X, Y, and Z at each pixel position in the horizontal direction of a projection image.

Figure 8:
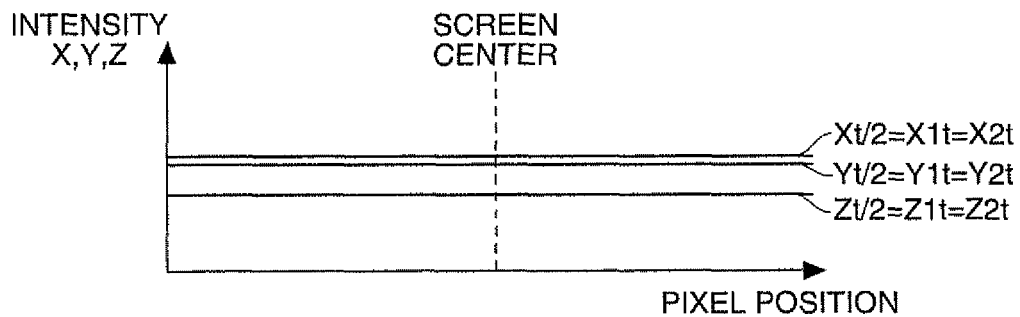
FIG. 8 is a diagram showing an example of 3D display unevenness correcting targets for each image display unit.

FIG. 8 shows an example of the 3D display unevenness correcting target for each image display unit. In FIG. 8, similarly to FIGS. 5A and 5B, the vertical axis represents a stimulus value as the intensity, and the horizontal axis represents the measurement result at each pixel position in the horizontal direction of a projection image.

Figure 9A:
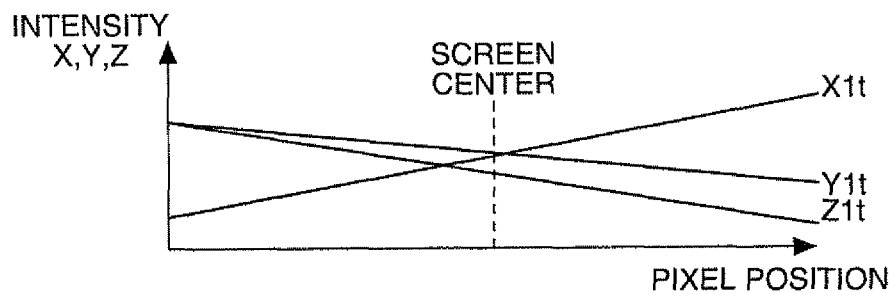
FIGS. 9A and 9B are diagrams showing an example of stack display unevenness correcting targets for each image display unit.
Figure 9B:
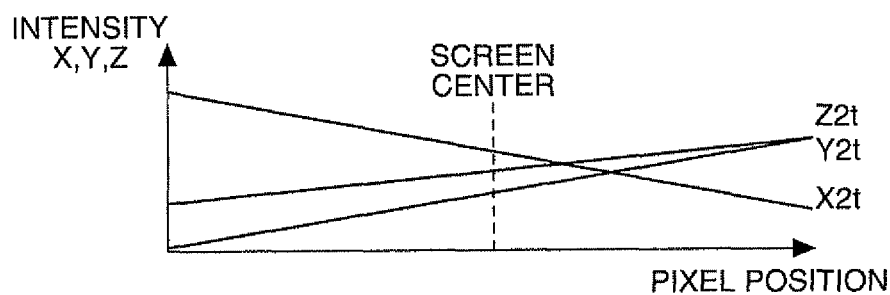

FIGS. 9A and 9B show examples of the stack display unevenness correcting target for each image display unit. FIG. 9A shows an example of the stack display unevenness correcting target for the first image display unit PJ1. FIG. 9B shows an example of the stack display unevenness correcting target for the second image display unit PJ2. In FIGS. 9A and 9B, similarly to FIGS. 5A and 5B, the vertical axis represents a stimulus value as the intensity, and the horizontal axis represents the measurement result at each pixel position in the horizontal direction of a projection image.

The image measuring unit 400, as shown in FIGS. 5A, 5B, and 6, acquires the measurement results of the stimulus values X, Y, and Z according to the CIE 1931 color system. The unevenness is due to differences in the ratio of X, Y, and Z depending on the pixel position within an image. Thus, the unevenness correction processing section 140 corrects an image such that the ratio of X, Y, and Z is constant regardless of the pixel position.

For example, a case where correction of unevenness is performed in accordance with the measurement result (Xc, Yc, Zc) (see FIG. 6) corresponding to the color of the center of a projection image, which is projected with images before correction displayed by the image display units overlapping each other, will be described. In such a case, using the measurement result of the projection image acquired by projecting images displayed by the image display units with the images overlapping each other at each pixel position is (Xt, Yt, Zt), the 3D display unevenness correcting target generating part 512 generates a 3D display unevenness correcting targets (Xt, Yt, Zt) that satisfy the following equation (see FIG. 7).

$$Xc:Yc:Zc = Xt:Yt:Zt \quad (2)$$

In addition, the 3D display unevenness correcting target that is generated by the 3D display unevenness correcting target generating part 512 is generated such that unevenness of images that are individually displayed by the image display units is reduced, and the colors of images, which are displayed by the image display units, that correspond to a given gray scale value are the same.

Here, the stimulus values X, Y, and Z that are acquired by measuring a projection image that is acquired by projecting an image after correction displayed by the first image display unit PJ1 are denoted by (X1t, Y1t, Z1t). In addition, the stimulus values X, Y, and Z that are acquired by measuring a projection image that is acquired by projecting an image after correction displayed by the second image display unit PJ2 are denoted by (X2t, Y2t, Z2t). Since additive color mixing is realized, the following equations are satisfied.

$$X1t = X2t = \frac{Xt}{2} \quad (3)$$

$$Y1t = Y2t = \frac{Yt}{2}$$

$$Z1t = Z2t = \frac{Zt}{2}$$

In addition, in order to be correctable all the time regardless of the gray scale, it is preferable that the correction amount is set only in the negative direction. Here, in-plane minimum values of the stimulus values X, Y, and Z in a projection image that is acquired by projecting an image before correction that is displayed by the first image display unit PJ1 are denoted by (X1min, Y1min, Z1min). In addition, in-plane minimum values of the stimulus values X, Y, and Z in a projection image that is acquired by projecting an image before correction that is displayed by the second image display unit PJ2 are denoted by (X2min, Y2min, Z2min). In FIGS. 5A and 5B, the minimum values of the stimulus values X, Y, and Z at the pixel positions arranged in the horizontal direction of the image are shown. Here, (Xt, Yt, Zt), (X1t, Y1t, Z1t), or (X2t, Y2t, Z2t) needs to satisfy the following conditions.

$$X1t = \frac{Xt}{2} \leq X1\min \quad (4)$$

$$Y1t = \frac{Yt}{2} \leq Y1\min$$

$$Z1t = \frac{Zt}{2} \leq Z1\min$$

$$X2t = \frac{Xt}{2} \leq X2\min$$

$$Y2t = \frac{Yt}{2} \leq Y2\min$$

$$Z2t = \frac{Zt}{2} \leq Z2\min$$

The 3D display unevenness correcting target generating part 512 generates (Xt, Yt, Zt), (X1t, Y1t, Z1t), and (X2t, Y2t, Z2t) that satisfy Equation (2) and Equation (4) and have the maximum values. Here, stimulus values X, Y, and Z of a projection image that is acquired by projecting an image before correction that is displayed by the first image display unit PJ1 are denoted by (X1, Y1, Z1), and stimulus values X, Y, and Z of a projection image that is acquired by projecting an image before correction that is displayed by the second image display unit PJ2 are denoted by (X2, Y2, Z2). Then, the correction amounts (ΔX1, ΔY1, ΔZ1) of the input image signal supplied to the first image display unit PJ1 and the correction amounts (ΔX2, ΔY2, ΔZ2) of the input image signal supplied to the second image display unit PJ2 are as follows.

$$\Delta X1 = \frac{Xt}{2} - X1 \leq 0 \quad (5)$$

$$\Delta Y1 = \frac{Yt}{2} - Y1 \leq 0$$

-continued $$\Delta Z1 = \frac{Zt}{2} - Z1 \le 0$$

$$\Delta X2 = \frac{Xt}{2} - X2 \le 0$$

$$\Delta X2 = \frac{Yt}{2} - Y2 \le 0$$

$$\Delta Z2 = \frac{Zt}{2} - Z2 \le 0$$

The 3D display unevenness correction table calculating part 514 calculates correction data for each image display unit with the above-described 3D display unevenness correcting target used as a reference. The correction data arranged in a table is the 3D display unevenness correction table. The unevenness correction processing section 140 corrects the stimulus values X, Y, and Z at each pixel position of the image displayed by each image display unit based on the unevenness correction table generated as described above. Accordingly, as shown in FIG. 8, the projection images acquired by projecting the images displayed by each image display unit are corrected so as to be the same color (Xt/2, Yt/2, Zt/2).

Stack Display Unevenness Correcting Target Generating Part

The stack display unevenness correcting target is not limited being the same as the 3D display unevenness correcting target. The stack display unevenness correcting target generating section 522 generates the stack display unevenness correcting target by using the result of measurement of a projection image projected onto the polarization conservation screen SCR that is performed by the image measuring unit 400.

The stack display unevenness correcting target generating part 522, similarly to the 3D display unevenness correcting target generating part 512, generates a stack display unevenness correcting target that satisfies Equation (2) (see FIG. 7). In addition, the stack display unevenness correcting target generated by the stack display unevenness correcting target generating part 522 is generated such that unevenness is reduced in a state in which projection images acquired by projecting images displayed by the image display units overlap each other. By using the result of measurement of the image acquired by projecting two images in an overlapping manner that is performed by the image measuring unit 400 as a reference, as described below, a stack display unevenness correcting target that does not decrease light use efficiency as less as possible can be generated.

When in-plane minimum values of stimulus values X, Y, and Z that are the result of measurement of the image acquired by projecting two images in an overlapping manner that is performed by the image measuring unit 400 are denoted by (Xmin, Ymin, Zmin), similarly to the case of the 3D display unevenness correcting target, in order to set the correction amount only in the negative direction, the stack display unevenness correcting targets (Xt, Yt, Zt) need to satisfy the following conditions.

$$Xt \le Xmin=(X1+X\times2)min$$

$$Yt \le Ymin=(Y1+Y2)min$$

$$Zt \le Zmin=(Z1+Z2)min \quad (6)$$

The stack display unevenness correcting target generating part 522 generates (Xt, Yt, Zt) that satisfy Equation (2) and Equation (6) and have the maximum values. Here, stimulus values X, Y, and Z of a projection image that is acquired by projecting an image before correction that is displayed by the first image display unit PJ1 are denoted by (X1, Y1, Z1), and stimulus values X, Y, and Z of a projection image that is acquired by projecting an image before correction that is displayed by the second image display unit PJ2 are denoted by (X2, Y2, Z2). Then, the correction amounts (ΔX1, ΔY1, ΔZ1) of the input image signal supplied to the first image display unit PJ1 and the correction amounts (ΔX2, ΔY2, ΔZ2) of the input image signal supplied to the second image display unit PJ2 are as follows. In the following equations, the stack display unevenness correcting target for the first image display unit PJ1 is denoted by (X1t, Y1t, Z1t), and the stack display unevenness correcting target for the second image display unit PJ2 is denoted by (X2t, Y2t, Z2t).

$$\Delta X1 = \frac{Xt - (X1 + X2)}{2} = X1t - X1 \le 0 \quad (7)$$

$$\Delta Y1 = \frac{Yt - (Y1 + Y2)}{2} = Y1t - Y1 \le 0$$

$$\Delta Z1 = \frac{Zt - (Z1 + Z2)}{2} = Z1t - Z1 \le 0$$

$$\Delta X2 = \frac{Xt - (X1 + X2)}{2} = X2t - X2 \le 0$$

$$\Delta Y2 = \frac{Yt - (Y1 + Y2)}{2} = Y2t - Y2 \le 0$$

$$\Delta Z2 = \frac{Zt - (Z1 + Z2)}{2} = Z2t - Z2 \le 0$$

In addition, the stack display unevenness correcting targets (X1t, Y1t, Z1t) for the first image display unit PJ1 and the stack display unevenness correcting targets (X2t, Y2t, Z2t) for the second image display unit PJ2 can be acquired as below and are as shown in FIGS. 9A and 9B.

$$X1t = \frac{Xt - (X1 + X2)}{2} + X1 \quad (8)$$

$$Y1t = \frac{Yt - (Y1 + Y2)}{2} + Y1$$

$$Z1t = \frac{Zt - (Z1 + Z2)}{2} + Z1$$

$$X2t = \frac{Xt - (X1 + X2)}{2} + X2$$

$$Y2t = \frac{Yt - (Y1 + Y2)}{2} + Y2$$

$$Z2t = \frac{Zt - (Z1 + Z2)}{2} + Z2$$

As above, the stack display unevenness correcting target is generated such that unevenness is reduced in the image acquired by projecting two images in an overlapping manner. However, reduction of unevenness in the image formed by a single image display unit is not considered. Compared to a case where a 3D display unevenness correcting target is acquired, the restraint condition for generating a correction target is loosely set, as shown in FIG. 7, and accordingly the values of the correction targets (Xt, Yt, Zt) can be set to be large.

In addition, in this embodiment, as shown in FIG. 1, images displayed by the image display units can overlap each other in the state in which the optical systems configuring the image display units are inverted from each other. Accordingly, the unevenness of the images formed in the image display units also can overlap in inverted states, and therefore, the unevenness decreases in a case where two images overlap each other.

Accordingly, the following equations can be expected to be satisfied. Thus, the stack display unevenness correcting targets (Xt, Yt, Zt) satisfying Equation (6) have values greater than those of the 3D display unevenness correcting targets (Xt, Yt, Zt) satisfying Equation (4). Therefore, compared to the 3D display mode, a correction target that does not decrease the light use efficiency as less as possible can be generated in the stack display mode.

$$2 \times X1\min < X\min$$

$$2 \times Y1\min < Y\min$$

$$2 \times Z1\min < Z\min$$

$$2 \times X2\min < X\min$$

$$2 \times Y2\min < Y\min$$

$$2 \times Z2\min < Z\min \tag{9}$$

Unevenness Correction Table Calculating Part

The 3D display unevenness correction table calculating part 514 calculates 3D display unevenness correction tables by using the 3D display unevenness correcting target generated as described above for each image display unit. In addition, the stack display unevenness correction table calculating part 524 calculates stack display unevenness correction tables by using the stack display unevenness correcting target generated as described above for each image display unit. More specifically, when a gray scale value at the pixel position (i,j) of the input image signal is denoted by Wij (Rij=Gij=Bij), the 3D display unevenness correction table calculating part 514 and the stack display unevenness correction table calculating part 524 generate tables for acquiring the pixel values (Rij', Gij', Bij') at the pixel position (i,j) of an image signal after correction based on the correction targets (X1t, Y1t, Z1t) and (X2t, Y2t, Z2t).

The 3D display unevenness correction table calculating part 514 and the stack display unevenness correction table calculating part 524 can be similarly implemented. Thus, hereinafter, the process of the 3D display unevenness correction table calculating part 514 will be described. In addition, in each correction table calculating part, the correction table is calculated by using a similar process for each image display unit. Thus, hereinafter, the process of calculating the correction table for the first image display unit PJ1 will be described.

First, the 3D display unevenness correction table calculating part 514 acquires stimulus values X, Y, and Z of projection images acquired by projecting images having gray scale values before and after correction, which are generated by the image display units, at the pixel position (i,j) that are measured for each gray scale by the image measuring unit 400. Hereinafter, measurement values before correction are denoted by (X1, Y1, Z1), and the measurement values after correction are denoted by (X1t, Y1t, Z1t). By using such measurement results, the 3D display unevenness correction table calculating part 514 calculates 3D display unevenness correcting targets for each gray scale.

Figure 10A:
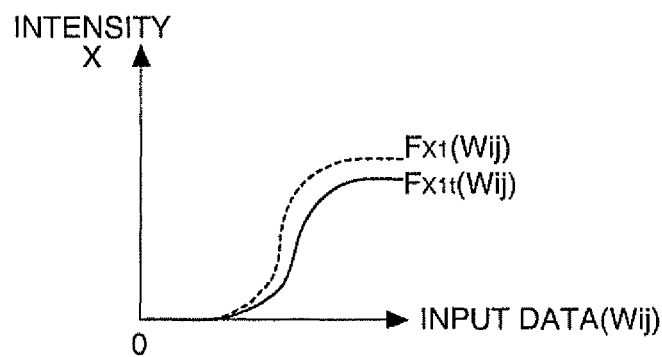
FIGS. 10A, 10B, and 10C are diagrams showing examples of the results of measurement of projection images before and after correction, which are acquired by projecting an image displayed by the first image display unit, at the pixel position (i,j).
Figure 10B:
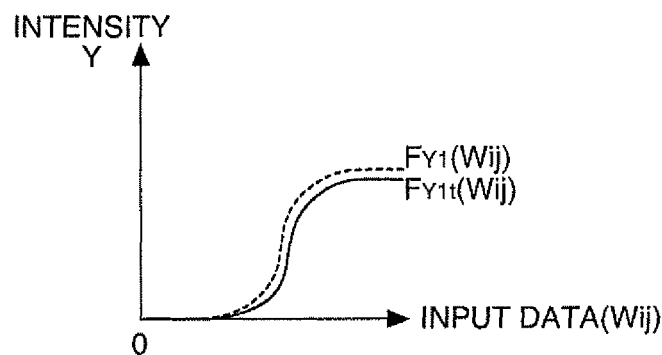
Figure 10C:
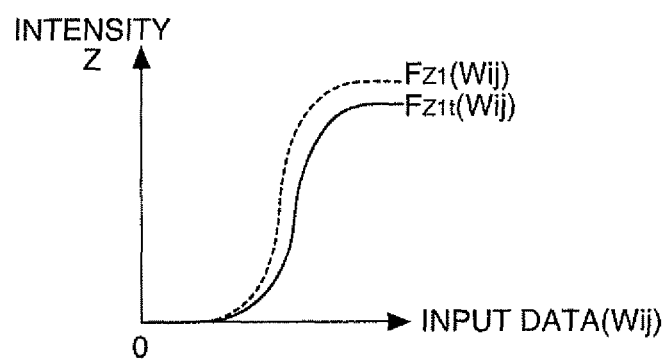

FIGS. 10A, 10B, and 10C show examples of the results of measurement of projection images before and after correction, which are acquired by projecting an image displayed by the first image display unit PJ1, at the pixel position (i,j). FIG. 10A shows the results of measurement of the stimulus value X. FIG. 10B shows the results of measurement of the stimulus value Y. FIG. 10C shows the results of measurement of the stimulus value Z. In FIGS. 10A to 10C, the vertical axis represents one of the stimulus values X, Y, and Z, and the horizontal axis represents the gray scale value.

In FIG. 10A, $F_{X1}(Wij)$ is acquired by plotting the stimulus value X before correction, and $F_{X1t}(Wij)$ is acquired by plotting a correction target X1t. In FIG. 10B, $F_{Y1}(Wij)$ is acquired by plotting the stimulus value Y before correction, and $F_{Y1t}(Wij)$ is acquired by plotting a correction target Y1t. In FIG. 10C, $F_{Z1}(Wij)$ is acquired by plotting the stimulus value Z before correction, and $F_{Z1t}(Wij)$ is acquired by plotting a correction target Z1t. Base on the characteristic curves shown in FIGS. 10A to 10C, the 3D display unevenness correction table calculating part 514 acquires an input value for acquiring a desired correction target and acquires correction data corresponding to the correction amount required for acquiring the input value.

When the characteristic curves shown in FIGS. 10A to 10C are acquired, the 3D display unevenness correction table calculating part 514 converts XYZ values shown in FIGS. 10A to 10C into RGB values by using an XYZ/RGB conversion matrix $M^{-1}$ that is derived from the RGB characteristics of the image projecting apparatus by using a known method. For example, when RGB values after conversion that correspond to the stimulus values (X1, Y1, Z1) before correction and the stimulus values (X1t, Y1t, Z1t) after correction are denoted by (R1, G1, B1) and (R1t, G1t, B1t), the RGB values are acquired as below by using the XYZ/RGB conversion matrix $M^{-1}$.

$$\begin{bmatrix} R1 \\ G1 \\ B1 \end{bmatrix} = M^{-1} \begin{bmatrix} X1 \\ Y1 \\ Z1 \end{bmatrix}, \begin{bmatrix} R1t \\ G1t \\ B1t \end{bmatrix} = M^{-1} \begin{bmatrix} X1t \\ Y1t \\ Z1t \end{bmatrix} \tag{10}$$

For example, when the RGB characteristic of the image projecting apparatus is an sRGB (standard RGB) color space, the following matrix can be used as the XYZ/RGB conversion matrix $M^{-1}$ in Equation 10.

$$M^{-1} = \begin{bmatrix} 0.4124 & 0.3576 & 0.1805 \\ 0.2126 & 0.7152 & 0.0722 \\ 0.0193 & 0.1192 & 0.9505 \end{bmatrix}^{-1} \tag{11}$$

Figure 11A:
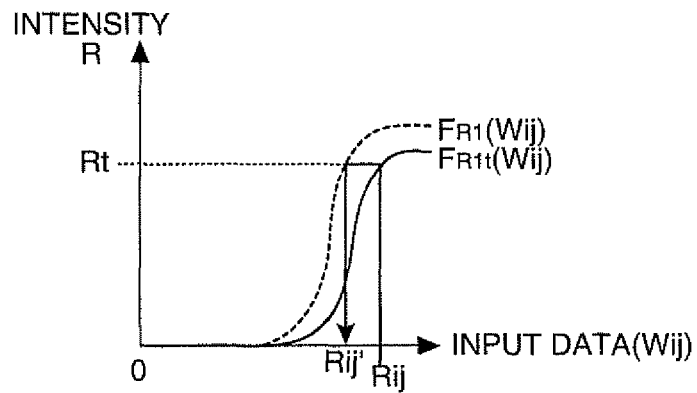
FIGS. 11A, 11B, and 11C are diagrams showing examples of RGB values before and after correction at the pixel position (i,j) after conversion.
Figure 11B:
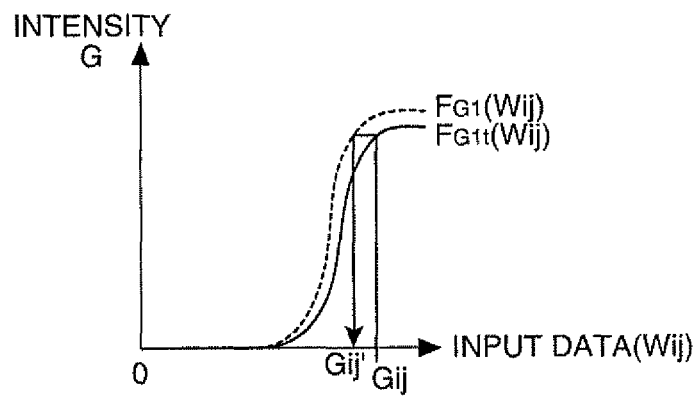
Figure 11C:
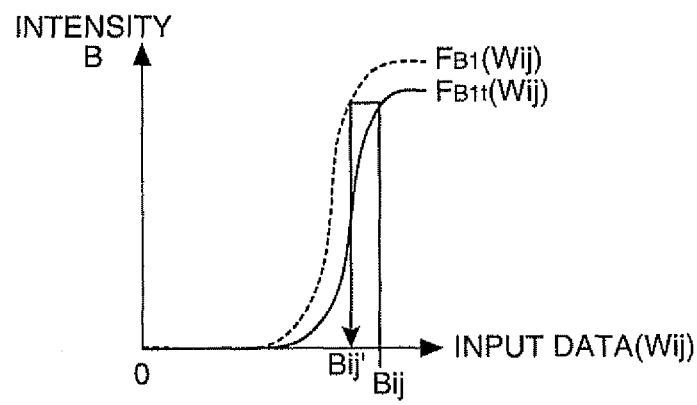

FIGS. 11A, 11B, and 11C show examples of the RGB values (R1, G1, B1) and (R1t, G1t, B1t) before and after correction at the pixel position (i,j) after conversion. FIG. 11A shows the result of conversion of the R value. FIG. 11B shows the result of conversion of the G value. FIG. 11C shows the result of conversion of the B value. In FIGS. 11A to 11C, the vertical axis represents one of the RGB values, and the horizontal axis represents the gray scale value.

In FIG. 11A, $F_{R1}(Wij)$ is acquired by plotting the conversion result of R1 before correction, and $F_{R1t}(Wij)$ is acquired by plotting the conversion result of R1t after correction. In FIG. 11B, $F_{G1}(Wij)$ is acquired by plotting the conversion result of G1 before correction, and $F_{G1t}(Wij)$ is acquired by plotting the conversion result of G1t after correction. In FIG. 11C, $F_{B1}(Wij)$ is acquired by plotting the conversion result of B1 before correction, and $F_{B1t}(Wij)$ is acquired by plotting the conversion result of B1t after correction.

Next, the 3D display unevenness correction table calculating part 514 acquires the pixel values (Rij', Gij', Bij') after correction that are required for realizing desired correction targets (Rt, Gt, Bt) as the following equation by searching the characteristic curves shown in FIGS. 11A to 11C.

$$FR1t(Rij)=FR1(Rij')$$

$$FG1t(Gij)=FG1(Gij')$$

$$FB1t(Bij)=FB1(Bij') \quad (12)$$

The 3D display unevenness correction table calculating part 514 calculates the correction amounts (ΔWRij, ΔWGij, ΔWBij) through Equation (1) by using the pixel values (Rij', Gij', Bij') acquired by using Equation (12).

The 3D display unevenness correction table calculating part 514 performs the process as described above for each gray scale in each pixel position within the image. As a result, the 3D display unevenness correction table calculating part 514 can generate a correction table corresponding to the correction amounts (ΔWRij, ΔWGij, ΔWBij) of the gray scale value Wij at the pixel position (i,j). This correction table is stored as the first correction table in the first correction table storing portion 122 that is arranged in correspondence with the first image display unit PJ1.

Similarly, the 3D display unevenness correction table calculating part 514 can generate a correction table for the second image display unit PJ2. This correction table is stored as the second correction table in the second correction table storing portion 124 that is arranged in correspondence with the second image display unit PJ2.

In addition, similarly, the stack display unevenness correction table calculating part 524 can generate correction tables for the first image display unit PJ1 and the second image display unit PJ2. The correction table for the first image display unit PJ1 is stored as the third correction table in the third correction table storing portion 132. The correction table for the second image display unit PJ2 is stored as the fourth correction table in the fourth correction table storing portion 134.

The correction table generating unit 500 that performs the process as described above is ideally prepared as a table corresponding to the correction amounts of the gray scale values at all the pixel positions within the image. However, in order to decrease the storage capacity of the unevenness correction table storing section 110, the correction table generating unit 500 may be prepared as a table corresponding to the correction amounts of gray scale values at specific pixel positions and is appropriately supplemented through a known interpolation process.

As described above, according to Embodiment 1, the applied unevenness correction table is changed in accordance with the display mode. Accordingly, a uniform image without any unevenness can be displayed in any case of the 3D display or the stack display.

Embodiment 2

In Embodiment 1, a configuration in which a plurality of images displayed by a plurality of image display units housed in one casing overlap each other and is projected has been described. However, the invention is not limited thereto. For example, the invention can be applied to an image projecting system (an image display system in a broad sense) in which images displayed by image display units are projected and then overlap each other.

Figure 12:
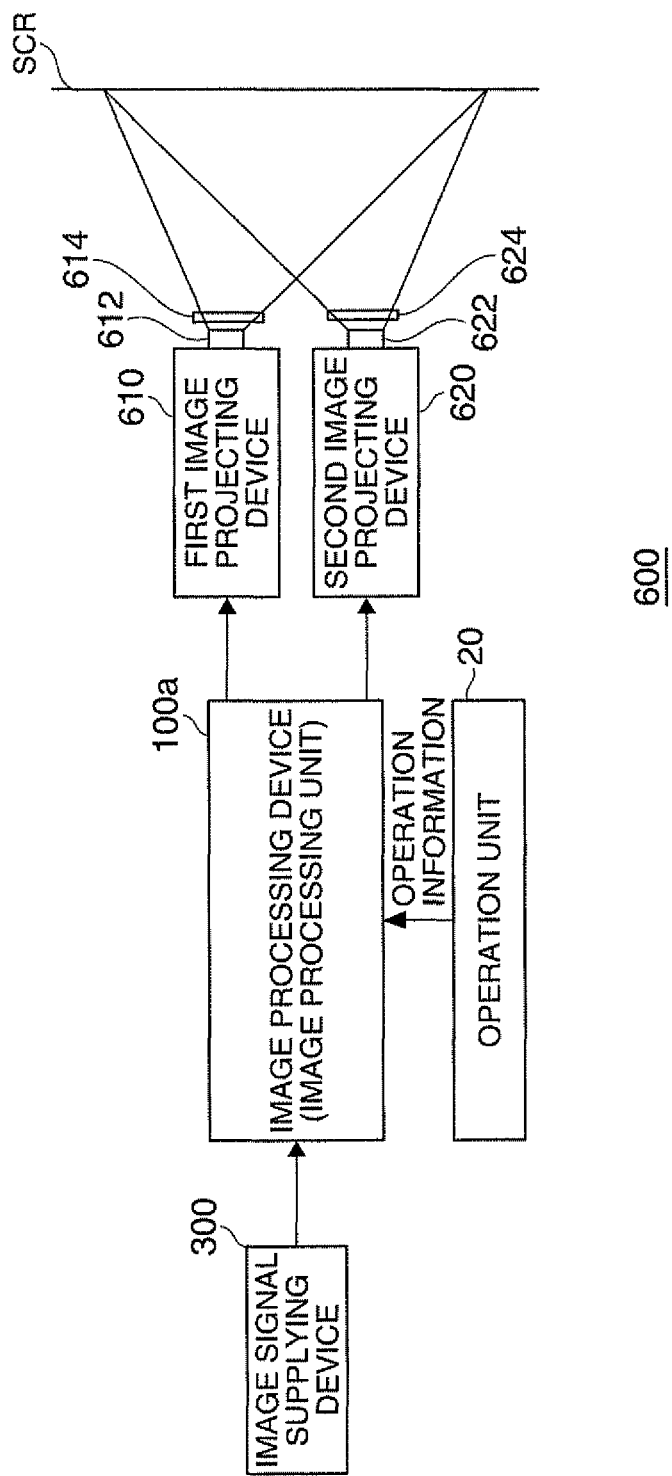
FIG. 12 is a block diagram showing an example of the configuration of an image projecting system according to Embodiment 2 of the invention.

FIG. 12 is a block diagram showing an example of the configuration of an image projecting system according to Embodiment 2 of the invention. In FIG. 12, the same reference numeral is assigned to the same portion as in FIG. 1, and the description thereof is appropriately omitted.

In the image projecting system 600 according to Embodiment 2, a first image projecting device 610 (an image display unit in a broad sense) and a second image projecting device 620 are disposed. The first image projecting device 610 includes the first image display unit PJ1 shown in FIG. 1, a projection lens 612, and a polarization filter 614. The first image projecting device 610 projects an image displayed by the first image display unit PJ1 onto a polarization conservation screen SCR by using the projection lens 612. At this time, the first image projecting device 610 projects the image while setting the polarization direction of color light of each color component to be uniform as being, for example, s-polarized light using the polarization filter 614. The second image projecting device 620 includes the second image display unit PJ2 shown in FIG. 1, a projection lens 622, and a polarization filter 624. The second image projecting device 620 projects an image displayed by the second image display unit PJ2 onto the polarization conservation screen SCR by using the projection lens 622. At this time, the second image projecting device 620 projects the image while setting the polarization direction of color light of each color component to be uniform as being, for example, p-polarized light using the polarization filter 624.

An image processing device 100a that supplies image signals to the first image projecting device 610 and the second image projecting device 620 includes the function of the image processing unit 100 according to the Embodiment 1. This image processing device 100a, similarly to the image processing unit of Embodiment 1, performs an unevenness correcting process for the input image signal supplied from an image supplying device 300 based on an unevenness correction table corresponding to a display mode that is designated according to operation information transmitted from an operation unit 20. In addition, the image processing device 100a, differently from the image processing unit of Embodiment 1, can perform a 3D display or a stack display by supplying image signals in which the arrangements of pixels in the horizontal direction are the same to the first image projecting device 610 and the second image projecting device 620. The function of the image processing device 100a may be built in the first image projecting device 610 or the second image projecting device 620.

Embodiment 3

In Embodiment 1 or Embodiment 2, an example in which images displayed by two image display units overlap each other has been described. However, an embodiment of the invention can be applied to a case where images displayed by n (here, n is an integer equal to or greater than "3") image display units overlap one another. In such a case, a multiple parallax image can be displayed in a 3D display, and a display in which the unevenness is reduced can be performed in both display modes by changing the unevenness correction table corresponding to a display mode in accordance with the display mode.

Even in such a case, when a 3D display unevenness correcting target is generated, by substituting Equation (4) with the following equation, a 3D display unevenness correction table can be generated, similarly to Embodiment 1.

$$X1t = \frac{Xt}{2} \le X1\min$$

$$Y1t = \frac{Yt}{2} \le Y1\min \quad (13)$$

-continued $$Z1t = \frac{Zt}{2} \leq Z1\min$$

$$X2t = \frac{Xt}{2} \leq X2\min$$

$$Y2t = \frac{Yt}{2} \leq Y2\min$$

$$Z2t = \frac{Zt}{2} \leq Z2\min$$

...

$$Xnt = \frac{Xt}{2} \leq Xn\min$$

$$Ynt = \frac{Yt}{2} \leq Yn\min$$

$$Znt = \frac{Zt}{2} \leq Zn\min$$

In addition, when a stack display unevenness correcting target is generated, by substituting Equation (6) with the following equation, a stack display unevenness correcting table can be generated, similarly to Embodiment 1.

$$Xt \leq X\min = (X1+X2+\ldots+Xn)\min$$

$$Yt \leq Y\min = (Y1+Y2+\ldots Yn)\min$$

$$Zt \leq Z\min = (Z1+Z2+\ldots Zn)\min \quad (14)$$

As above, an image processing device, an image display system, an image processing method, and the like according to embodiments of the invention have been described. However, the invention is not limited to the above-described embodiments and can be performed in various forms within the scope not departing from the concept thereof. For example, modifications as below can be made therein.

1. In some of the above-described embodiments, the image projecting apparatus has been described as an example. However, the invention is not limited thereto. It is apparent that an embodiment of the invention can be applied to general devices that display images in an overlapping manner based on image signals.

2. An embodiment of the invention is not limited to the 3D display method described in some of the above-described embodiments, and various 3D display methods can be used.

3. In some of the above-described embodiments, an example in which the image display unit is configured by a light valve using a transmission-type liquid crystal panel of a so-called three-plate type has been described. However, a light valve using a single plate-type liquid crystal panel or a transmission-type liquid crystal panel having two or four or more plates can be used. In addition, a light valve using a transmission-type liquid crystal panel has been described as being used as an optical modulation element. However, the invention is not limited thereto. For example, a DLP (Digital Light Processing) (registered trademark), an LCOS (Liquid Crystal On Silicon), or the like may be used as the optical modulation element.

4. In the above-described embodiments, an example in which a display is performed by switching between a 3D display mode and a stack display mode has been described. However, the invention is not limited thereto.

5. In some of the above-described embodiments, an embodiment of the invention has been described as an image processing device, an image display system, an image processing method, and the like. However, the invention is not limited thereto. For example, an embodiment of the invention may be a program in which the processing sequence of a method of processing an image processing device (an image processing method) for implementing the invention or a method of processing an image display device (an image display method) for implementing the invention is defined or a recording medium having the program recorded thereon.

What is claimed is:

1. An image processing device that corrects unevenness of a display image that is generated by overlapping a plurality of images, the image processing device comprising:
    a correction table storing unit that stores a plurality of types of correction tables; and
    an unevenness correction processing unit that performs an unevenness correcting process of an input image signal corresponding to the plurality of images based on a correction table selected from the plurality of types of correction tables stored in the correction table storing unit that corresponds to a designated display mode.

2. The image processing device according to claim 1, wherein the correction table storing unit stores a first display mode correction table and a second display mode correction table, and
    the unevenness correction processing unit performs the unevenness correcting process of the input image signal based on the first display mode correction table if the designated display mode is a first display mode, and performs the unevenness correcting process of the input image signal based on the second display mode correction table if the designated display mode is a second display mode.

3. The image processing device according to claim 2, wherein the plurality of images includes a first image and a second image,
    the first display mode correction table is generated such that unevenness of the first image and unevenness of the second image are reduced, and colors of the first image and the second image corresponding to a given gray scale value are the same, and
    the second display mode correction table is generated such that the unevenness of the display images is reduced.

4. The image processing device according to claim 3, wherein the second display mode correction table is generated such that the unevenness of the first image is reduced by overlapping the first image and an image other than the first image.

5. The image processing device according to claim 3, wherein the first display mode is a three-dimensional display mode in which a parallax image is displayed by overlapping the first image and the second image, and
    the second display mode is a stack display mode in which a stack image is displayed by overlapping the first image and the second image.

6. The image processing device according to claim 5, wherein the first display mode correction table includes a first correction table and a second correction table,
    the second display mode correction table includes a third correction table and a fourth correction table,
    the unevenness correction processing unit includes:
        a first unevenness correction processing section that performs the unevenness correcting process of the input image signal based on the first correction table if the designated display mode is the first display mode and performs the unevenness correcting process of an input image based on the third correction table if the designated display mode is the second display mode; and
        a second unevenness correction processing section that performs the unevenness correcting process of the input image signal based on the second correction table if the designated display mode is the first display mode and performs the unevenness correcting process of the input image based on the fourth correction table if the designated display mode is the second display mode, the image signal after the unevenness correcting process performed by the first unevenness correction processing section is supplied to a first image display unit that generates the first image, and the image signal after the unevenness correcting process performed by the second unevenness correction processing section is supplied to a second image display unit that generates the second image.

7. An image display system comprising:
a first image display unit;
a second image display unit;
an operation unit that is used for designating a display mode; and
the image processing device according to claim 1 that supplies an image signal after an unevenness correcting process to at least one of the first image display unit and the second image display unit.

8. An image display system comprising:
a first image display unit;
a second image display unit;
a synthesis unit that composes image light corresponding to images generated by the first image display unit and the second image display unit;
an operation unit that is used for designating a display mode; and
the image processing device according to claim 1 that supplies an image signal after an unevenness correcting process to at least one of the first image display unit and the second image display unit,
wherein an image is displayed by using the image light synthesized by the synthesis unit.

9. An image processing method for correcting unevenness of a display image that is generated by overlapping a plurality of images, the image processing method comprising:
performing an unevenness correcting process of an input image signal corresponding to the plurality of images based on a correction table selected from a plurality of types of correction tables that corresponds to a designated display mode; and
supplying the image signal after the unevenness correcting process that is acquired in the performing of an unevenness correcting process to at least one image display unit.

* * * * *